(12) United States Patent
Nickel et al.

(10) Patent No.: US 8,021,619 B2
(45) Date of Patent: Sep. 20, 2011

(54) SEPARATION MODULE, METHOD FOR ITS PRODUCTION AND ITS USE

(75) Inventors: Andreas Nickel, Wetter (DE); Olaf Stange, Köln (DE); Ingolf Voigt, Jena (DE); Gundula Fischer, Stadtroda (DE); Michael Stahn, Hermsdorf (DE); Birgit Köhler, Posterstein (DE)

(73) Assignees: Bayer Aktiengesellschaft, Leverkusen (DE); Hermsforfer Inst. fur Technische Keramik E.V., Hermsdorf (DE)

( * ) Notice: Subject to any disclaimer, the term of this patent is extended or adjusted under 35 U.S.C. 154(b) by 835 days.

(21) Appl. No.: 10/600,391

(22) Filed: Jun. 20, 2003

(65) Prior Publication Data
US 2004/0076874 A1    Apr. 22, 2004

(30) Foreign Application Priority Data
Jun. 21, 2002   (DE) .................... 102 27 721

(51) Int. Cl.
*B01J 19/00* (2006.01)
(52) U.S. Cl. ............. 422/130; 55/522; 55/523; 55/527; 210/321.8; 210/323.2; 422/503; 422/504
(58) Field of Classification Search .......... 422/130, 422/99–101, 503–504; 429/104; 210/321.8, 210/323.2; 55/522–523, 527
See application file for complete search history.

(56) References Cited

U.S. PATENT DOCUMENTS

| | | | | |
|---|---|---|---|---|
| 2,961,062 A * | 11/1960 | Hickey et. al. | ...... | 96/8 |
| 3,277,959 A | 10/1966 | Withers | | |
| 3,536,611 A * | 10/1970 | De Filippi et al. | ...... | 210/646 |
| 3,690,465 A * | 9/1972 | McGinnis et al. | ...... | 210/321.88 |
| 4,268,278 A * | 5/1981 | Dobo et al. | ...... | 419/2 |
| 4,293,418 A | 10/1981 | Fujii et al. | ...... | 210/321.1 |
| 4,310,607 A * | 1/1982 | Shay | ...... | 429/104 |
| 4,640,774 A * | 2/1987 | Garcera et al. | ...... | 210/323.2 |
| 4,671,809 A * | 6/1987 | Taketomo et al. | ...... | 96/8 |
| 4,990,412 A * | 2/1991 | Hersey | ...... | 429/8 |
| 5,182,019 A * | 1/1993 | Cote et al. | ...... | 210/321.8 |
| 5,352,361 A * | 10/1994 | Prasad et al. | ...... | 210/321.81 |
| 5,366,625 A * | 11/1994 | Pedersen et al. | ...... | 210/321.78 |
| 5,779,897 A * | 7/1998 | Kalthod et al. | ...... | 210/321.8 |
| 6,217,764 B1 * | 4/2001 | Bellhouse | ...... | 210/321.69 |
| 6,350,618 B1 * | 2/2002 | Borrelli et al. | ...... | 436/174 |
| 6,887,304 B2 * | 5/2005 | Stroh et al. | ...... | 96/8 |

FOREIGN PATENT DOCUMENTS

| | | |
|---|---|---|
| DE | 1 501 595 | 12/1971 |
| DE | 43 22 278 | 1/1995 |
| EP | 0 166 994 | 4/1989 |
| FR | 0 092 839 | 8/1986 |

\* cited by examiner

*Primary Examiner* — Jyoti Nagpaul
(74) *Attorney, Agent, or Firm* — Norris McLaughlin & Marcus PA

(57) ABSTRACT

A separation module which contains at least one bundle of ceramic capillaries (9), in which, for controlling the material transport and the flow in the separation module, a certain distance is established between the capillaries (9) by joining. The separation module can be used in a variety of ways in the separation of substances by filtration, also in combination with further measures of chemical process engineering.

25 Claims, 4 Drawing Sheets a)

b)

a)

b)

c)

d)

e)

f)

a)

b)

SEPARATION MODULE, METHOD FOR ITS PRODUCTION AND ITS USE

This invention relates to a separation module which contains bundles of ceramic, capillary-like filter elements, and a method for its production and a use thereof.

BACKGROUND OF THE INVENTION

Ceramic filter elements have an asymmetric structure in which thin membrane layers are applied, with one or more intermediate layers, to a porous ceramic support. The porous ceramic support determines the external shape and the mechanical stability. Customary embodiments are:

Tubes

Tubes are produced by extrusion. The most widely used dimensions are:
1-channel tubes: external diameter (ED)/internal diameter (ID)=10 mm/7 mm,
7-channel tubes ED/channel diameter (CD)=25 mm/7 mm,
19-channel tubes ED/CD=25 mm/3.5 mm or larger.

The length of the industrially used filter elements is up to 1.00 m, in some cases up to 1.20 m.

Honeycombs

An extruded body consisting of a very large number of channels (round or polygonal) having small wall thicknesses is referred to as a honeycomb. In such a body, large membrane areas can be accommodated in a very small space. However, the wall thickness of the channel is too small for removing permeate to the outside. Individual channels are therefore closed in a reciprocal manner and used for permeate removal (EP 0 306 350, EP 0 433 582, EP 0 923 983 and WO 00/50156).

Plates

Plates are produced by pressing, casting or extrusion. The thickness of the plates is several millimeters. The plates can be produced with a profile. Feed, retentate and permeate channels are formed by stacking the plates.

Discs

Discs are produced by film casting. The thickness of the film is in the range of 0.5 mm-3 mm. The film pockets can be produced by laminating the discs (DE 4 330 163).

Capillaries

Capillaries having an external diameter of 10 mm to about 1 mm can be produced by extrusion. By approximately maintaining the ratio ID/ED=7/10, a high internal pressure resistance comparable with that of single-channel tubes is obtained in the case of the capillaries after firing. The capillaries are rigid and can be individually handled.

A special method is melt extrusion, in which the thermoplastic organic binder is used and the shaping takes place at elevated temperature (DE 694 00 874).

Hollow Fibers

The term hollow fibers is used in the case of external diameters of less than 1 mm. This requires a gas to flow through the capillaries during extrusion in order to prevent a collapse of the soft, plastic material (WO 99/22852). Very small diameters can be produced by spinning (JP 05/221752, JP 02/091221). For this purpose, a polymer is filled with a ceramic powder and this is spun as a hollow fiber or a polymer is dissolved in a solvent and a ceramic powder is suspended and spun in a precipitating bath. After firing, the hollow fibers retain a certain elasticity. They can no longer be processed as individual elements.

Ceramic filter elements are arranged parallel in housings. The result is a module which contains connections for feed and discharge (retentate) and a connection for the filtrate (permeate) and optionally a further one for flushing liquid (sweep). In the case of multichannel tubes, the membrane is applied to the inside of the channel and filtration is effected from the inside outwards. In the case of single-channel tubes, capillaries and hollow fibers, there are examples where the membrane is applied on the outside or inside. Where the diameter of the capillaries or hollow fibers is too small, an inner coating is no longer possible.

The module form, in particular the method of fixing the membrane elements, the flow conditions and the size, depends on the type of support and the specific separation method.

In tube modules, the tubes are installed individually and sealed by sealing rings or special sealing caps (EP 0 270 051, DE 198 46 041, EP 0 270 051) at the ends with the housing. Methods in which metallic connectors are adhesively bonded or soldered to the ends of the tubes have also been described (DE 4 131 407). In the case of capillaries and hollow fibers, this leads to an unacceptably complicated assembly or, because of the flexibility in the case of hollow fibers, is not possible at all. Methods in which a relatively large number of capillaries or hollow fibers are processed to give bundles are required here.

With the use of honeycombs, modules are described in which holes or slots are introduced laterally, which holes or slots open the permeate channel and permit lateral emergence of permeate (U.S. Pat. No. 5,855,781, EP 1 060 784).

Filter pockets are preferably provided with a central hole and threaded onto a permeate collecting tube. This gives stacks which are combined to form modules (DE 4 330 163).

In contrast to these modules, the present invention describes a module using ceramic capillaries. The following technical solutions are known in this area:

In EP 0 938 921, bundles of capillaries consisting of glass-like carbon membranes are placed in a mould and cast in a resin which is filled with a solid, the resin being subjected to an ultrasonic treatment.

EP 0 841 086 describes a module comprising hollow fibers which contains filaments (rods) having a diameter of from 0.06 mm to 3 mm, in the ratio of 0.5 times to 5 times the number of hollow fibers, for achieving mechanical stability, the hollow fibers and the rods being held at the ends by perforated plates. In US 01/0035374, hollow fiber bundles are stabilized by winding the filaments in a spiral around the bundles. Comparable mechanical stabilization is not necessary in the case of ceramic capillaries according to the present invention.

EP 0 941 759 describes a method for the production of an exchanger, in which a bundle of exchanger tubes is placed in a mould and then filled with a ceramic slip, dried and then sintered to give a plate. In a further step, an end plate is moulded in the same manner. Collecting tubes for feed and discharge are introduced into the first plate and the end plate, parallel to the tubes. It is mentioned that such an arrangement can be used for membrane modules, no capillaries being used and no application-specific distance between the tubes being established.

DE 4 133 250 claims a method for the production of membrane tube bundles, in which a uniform distance between the membrane tubes is established by widening of the ends to form regular polygons and connection in a substance-impermeable manner by adhesive bonding or welding. In contrast, the capillaries in the present invention are not widened at the ends.

EP 0 092 839 uses a nonporous end plate through which holes are drilled in which porous tubes are fastened by means of special connections. The fastening is effected by an enamel, glass, ceramic, carbon, cement or metal. In WO 01/87469, a completely ceramic module is assembled by joining ceramic supports to a housing comprising perforated end plates and cylindrical outer casing. In all these cases, the perforated plates serve for mechanical fixing of the tubes or capillaries. The tubes are a fixed distance apart, which however bears no relationship to the separation method, in particular no relationship to the amount of permeate.

JP 61/004509 uses an aqueous slip of a mixture of glass powder and ceramic powder with an adapted coefficient of expansion for sealing the ends of the porous glass membrane tubes. JP 57166244 describes the sealing of small tubes with a sealing material, e.g. glass, with the result that an air-tight end plate forms. In both cases, sealing of the ends of the capillaries and mechanical fixing are achieved. However, no application-related, defined distance is established.

U.S. Pat. No. 4,296,052, U.S. Pat. No. 4,224,386 and U.S. Pat. No. 4,219,613 describe the production of perforated plates for hollow fiber batteries, which consist of an upper helium-tight region and a porous region underneath and through which a large number of inorganic hollow fibers pass. The hollow fiber walls serve as diaphragms through which no material transport takes place and hence furthermore no defined distance between the hollow fibers is required.

It is the object of the invention to eliminate the described deficiencies of the prior art in the case of a separation module with optimum utilization of space based on the parameters of the specific application.

SUMMARY OF THE INVENTION

This object is achieved by a separation module which comprises at least one bundle of ceramic capillaries wherein the capillaries are separated from each other and the separation distance between the capillaries is established by joining.

DETAILED DESCRIPTION

The present invention concerns a separation module which contains at least one bundle of ceramic capillaries, in which a distance is established between the capillary tubes by joining, which is essential to the invention. The capillaries are combined at their endings by perforated plates, and a housing, which encloses the bundle, the housing having inlet and/or outlet pipe(s) connected to the inside of the capillaries for a first material flow and inlet and/or outlet pipe(s) connected to the interspace between the capillaries for a second material flow. Preferably, the distance between the capillaries is kept constant by spacers. The choice of the distance depends on the permeate volume which is to flow away without hindrance. The permeate volume in turn is determined by the type of membrane and the associated method of use, as explained with reference to the following examples 1 and 2 for the product according to the invention.

Figure 1:
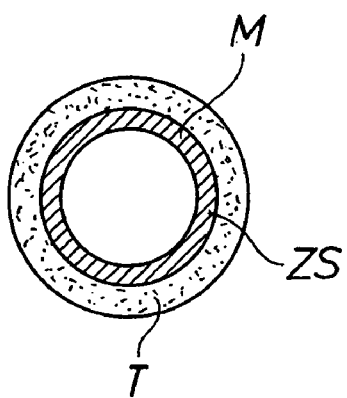
FIG. 1: Illustrates the basic asymmetric structure of tubular filter elements having a support (T), intermediate layer (ZS) and membrane (M) for a) inner coating and b) outer coating.
Figure 1:
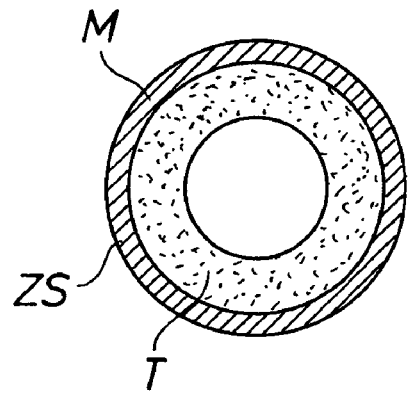
Figure 2:
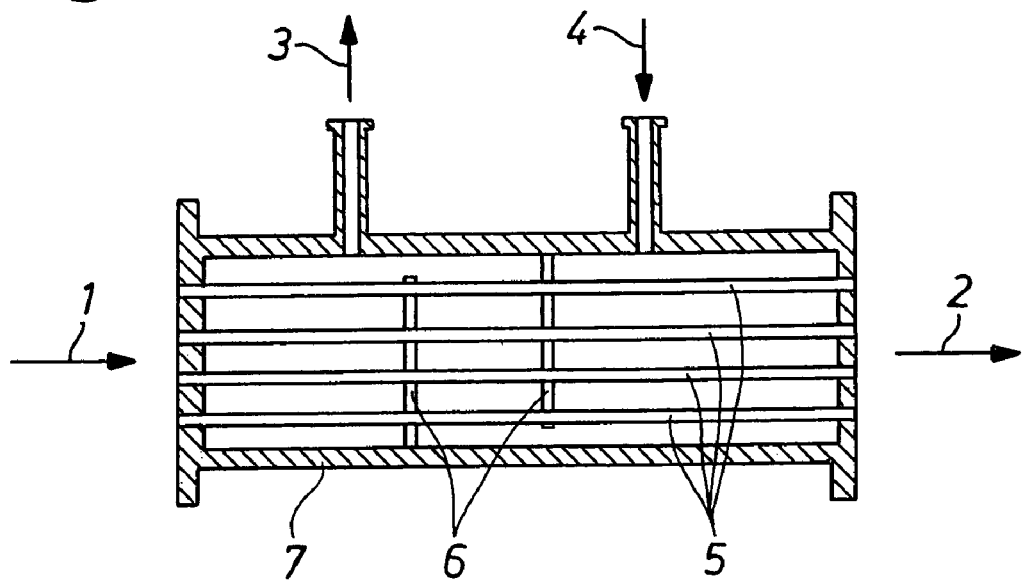
FIG. 2: Is a schematic diagram of a separation module having the connections for feed (1), retentate (2), permeate (3) and sweep (4) and the filter elements (5), baffle plates (6) for generating forced flow and the housing (7).

The invention is explained in more detail with reference to embodiments.

EXAMPLE 1

If capillaries having a length of 1 m, an external diameter of 1 mm and an internal diameter of 0.7 mm are used, a bundle of 100 capillaries has a membrane area of $0.2\ m^2$. The flow of a nanofiltration membrane is about 400 $l/(m^2\ h)$ at 20 bar. 80 l per hour emerge from the bundle described. The outer casing of the bundle would contain about 40 slots having a length of 1 m for the permeate to flow away. If it is assumed that the total amount of permeate would emerge from the interior of the bundle, 2 l/h emerge per slot. A slot width of 0.01 mm would result in a permeate flow rate of 0.05 m/s, which can be mastered without problems.

EXAMPLE 2

If the same capillary bundle is considered in pervaporation, a flow of up to 25 kg $H_2O/m^2$ must be expected in the case of a membrane. At 100° C. and 1 bar, the steam has a density of 1.694 $m^3/kg$. The capillary bundle described above and having an area of $0.2\ m^2$ results in a permeate volume of 8.47 $m^3/h$, which increases to 335 $m^3/h$ as a result of the reduced pressure of about 20 mbar on the permeate side. 8.38 $m^3/h$ of steam are removed per slot. With the same slot width as in example 1, the steam would flow at 232.5 m/s. Customary flow rates and tubes are from 25 m/s to 50 m/s at 20 mbar. This would correspond to a slot width of 0.1 mm. In order to keep the pressure drop on the permeate side as small as possible, lower flow rates of 2 m/s to 5 m/s are to be expected, which would correspond to a slot width of 1 mm.

The three variants of the production method according to the invention are explained in detail below, first in principle and then with reference to examples 3 to 5:

The capillaries are produced by extrusion and have an external diameter of 0.3 mm to 10 mm, preferably 1 mm to 2.5 mm, and an internal diameter of 0.3 mm to 8 mm, preferably 0.7 mm to 1.5 mm.

The production of the capillary bundle is effected in a first variant by sealing the ends with a polymer-, ceramic- and/or glass-containing casting compound. For this purpose, capillaries are placed with the ends in beaker-like moulds which have holes with a defined hole spacing for fixing the capillaries in the bottom. The beaker is filled with a casting compound. The casting compound encloses the capillaries completely and dries in air and at room temperature to such an extent that the beaker can be removed. In the case of polymeric casting compounds, curing can be effected, for example, at room temperature with addition of a curing agent in the case of epoxy resins or at slightly elevated temperature in the case of one-component resins. With the use of ceramic- and/or glass-containing casting compounds, the curing takes place thermally at temperatures of from 150° C. to 1600° C. The procedure is carried out simultaneously or in succession at the two ends of the capillary bundle. When it is carried out simultaneously, a casting compound which is dimensionally stable after brief drying in air is used. By cutting off or grinding the ends of the bundle, the channels partly closed during sealing are opened again.

In this variant, the defined distance according to the invention is established by the hole pattern in the baseplate of the mould and the total shrinkage of the moulding and can be varied in the range from 0.05 mm to 10 mm and chosen according to the expected flow values of the membrane.

In a second variant, the distance is established in a defined manner with the use of perforated plates. The perforated plates may consist of different materials, e.g. plastic, metal or ceramic. The holes of the perforated plate are slightly larger in diameter than the diameter of the capillaries. The capillaries are inserted into the holes of the perforated plate.

In the case of perforated plates of plastic, metal or sintered ceramic, joining is effected with the use of polymer-, ceramic- or glass-containing slips, pastes or adhesives. For this purpose, the perforated plates are completely or partly immersed in the joining material or the joining material is introduced into the cavities between the hole wall and the outside of the capillary. First, drying is carried out at room temperature in air. In the case of polymeric casting compounds, curing is effected, for example, at room temperature with addition of a curing agent in the case of epoxy resins or at slightly elevated temperature in the case of one-component resins. With the use of ceramic- and/or glass-containing casting compounds, curing is effected thermally at temperatures of from 150° C. to 1600° C. The procedure is carried out simultaneously or in succession at the two ends of the capillary bundle. If it is carried out simultaneously, a pasty joining material is used which is dimensionally stable after brief drying in air.

For the production of the capillary bundle, unsintered ceramic perforated plates may also be used. For this purpose, the ceramic capillaries are inserted into the perforated plate. The thermal treatment at the sintering temperature of the perforated plate is then effected, said perforated plate shrinking onto the capillaries as a result of its shrinkage, so that a mechanically stable and tight connection forms.

It is also possible to insert unsintered ceramic capillaries into unsintered ceramic perforated plates and then to fire both together (co-firing).

If the joining leads to closing of the channels of the capillaries, these are opened again by cutting off or grinding the ends of the bundle. The defined distance is established in this case by the hole pattern in the perforated plate and may be varied in the range from 0.1 mm to 10 mm and chosen according to the expected flow values of the membrane.

In a third variant, a defined distance is established between the ceramic capillary by winding the capillaries with strip-like films of a curable material.

In the case of polymeric films, curing is effected at slightly elevated temperature. With the use of ceramic- and/or glass-containing films, curing is effected thermally at from 150° C. to 1600° C. The procedure is carried out simultaneously at the two ends of the capillary bundle. In addition to the end of the capillary bundle, strips can be simultaneously wound at certain distances over the length of the bundle, which strips act as fixed, tight spacers after curing. By changing the winding algorithm, it is possible to establish narrow secant-like cutouts in the circular spacer, which result in forced flow similarly to baffle plates.

The winding can also be effected with unsintered ceramic capillaries and unsintered ceramic films. In this case, a fixed and tight connection is achieved by co-firing at temperatures up to 1700° C.

The defined distance is determined in this case by the thickness of the joining film and the winding algorithm and can be varied in the range from 0.1 mm to 1 mm and chosen according to the expected flow values of the membrane.

These joining processes result in capillary bundles which typically have a diameter of from 10 mm to 250 mm, preferably from 20 mm to 50 mm. The distance between the capillaries in the bundle is preferably <3 mm. In a module, several of these capillary bundles produced in this manner are preferably arranged parallel. The housing may consist of stainless steel and the sealing of feed space and permeation space can be effected by an elastomer O-ring.

To meet the highest requirements with respect to the chemical and thermal resistance, the housing is produced from ceramic. The shaping of the housing parts is then effected by means of casting and/or by mechanical processing of ceramic blanks in the leather-hard state. The connection of housing and capillary bundle with simultaneous separation of the feed space and permeation space is effected in the case of sintered housing parts by joining with ceramic- or glass-containing slip, paste or adhesive with subsequent thermal treatment at temperatures of from 500° C. to 1400° C.

For applications of the separation module in liquid filtration, gas separation or pervaporation, a membrane layer on the porous ceramic capillaries is necessary. The membrane layer can in principle be present either on the inside of the capillaries or on their outside; or on both the inside and the outside. The membrane layers are produced by various methods of slip coating, the sol-gel technique or crystallization from solution. In all cases, this is followed by a thermal treatment (firing) of the membrane layer at temperatures>300° C. With the use of plastic-containing casting compounds, perforated plates or joining films of plastic, a thermal treatment of the capillary bundle at such high temperatures is not possible. In this case, the membrane is applied to the capillary bundle prior to joining. However, if it is a completely ceramic capillary bundle or module, the coatings is effected at least partly after completion of the capillary bundle or of the module.

EXAMPLE 3

Figure 3:
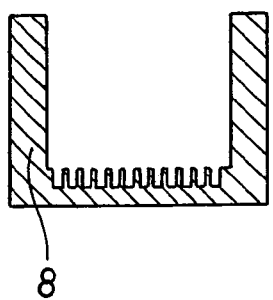
FIG. 3: Illustrates the principle of joining using a casting material a) gypsum mould (8), b) gypsum mould (8) with capillaries (9), c) gypsum mould (8) with capillaries (9) and introduced casting slip (10), d) capillary bundle with unsintered end plate (11), e) trimmed capillary bundle with unsintered end plate (11), f) capillary bundle with sintered end plate (12).
Figure 3:
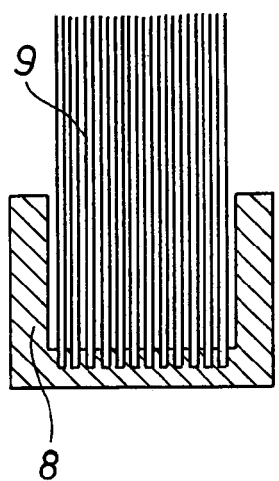
Figure 3:
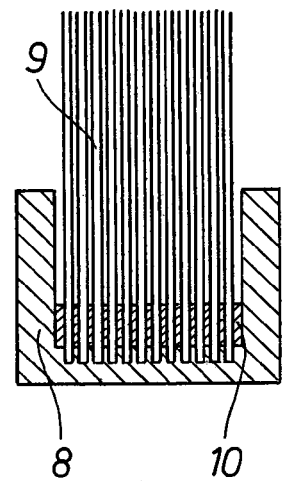
Figure 3:
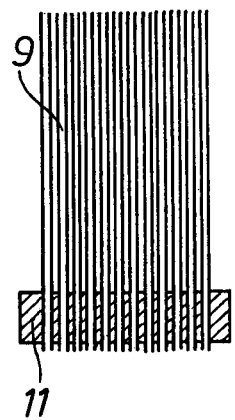
Figure 3:
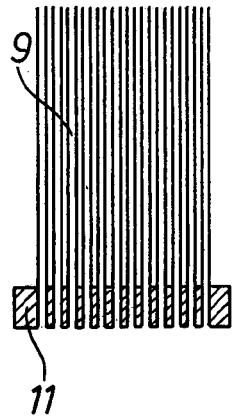
Figure 3:
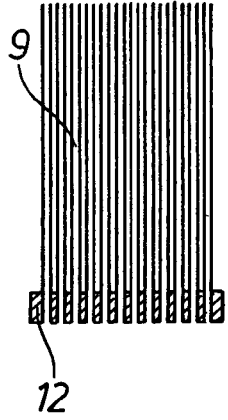

Join Capillary Bundle with Casting Compound (FIG. 3)

Sintered porous capillaries 9 having an external diameter of 3.6 mm and an internal diameter of 2.0 mm, comprising 99.8% of alumina, are cut to a length of 350 mm. For the casting compound, a high-alumina porcelain slip is prepared, the main components of which are 52% of clay, 11% of quartz, 13% of feldspar, 26% of alumina, 31% of water (based on solid), 0.5% of waterglass (based on solid) and 0.2% of sodium carbonate (based on solid). The mould 8 used for casting consists of moulding plaster. 19 holes having a diameter of 3.6 mm and a depth of 8 mm are present in the bottom of the mould (FIG. 3a). The internal diameter of the mould is 27 mm. The capillaries 9 are inserted into the holes at the bottom of the mould (FIG. 3b) and the slip 10 prepared in a drum mill according to the batch specifications is introduced manually and continuously into the mould (FIG. 3c). Demoulding of the unfired end plate 11 is possible in the leather-hard state at a residual moisture content of 12-15% (FIG. 3d). This is followed by white drying to a residual moisture content of 2%. The joining of the second side of the capillary bundle is effected in the same manner. Thereafter, the capillaries projecting at the end faces on the dried capillary bundle blanks are cut off using a diamond cutting wheel and the end faces are cleaned (FIG. 3e). The subsequent firing cycle consists of the following stages: 1) heat-up phase, 2) oxidative cleaning phase, 3) reductive hard firing phase, 4) oxidative cooling phase. The sintering of the bundle is effected horizontally at a sintering temperature of 1470° C. and with a holding time of 45 min. Subsequent processing of the bundle with the sintered end plate 12 is not required (FIG. 3f).

EXAMPLE 4

Figure 4:
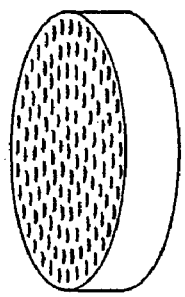
FIG. 4: Illustrates a perforated disc.
Figure 5:
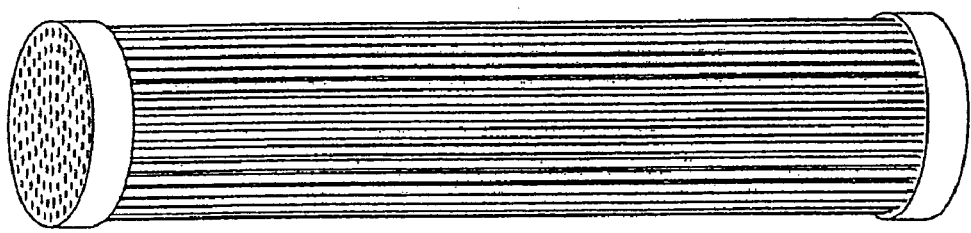
FIG. 5: Illustrates a separation module according to the invention.
Figure 6:
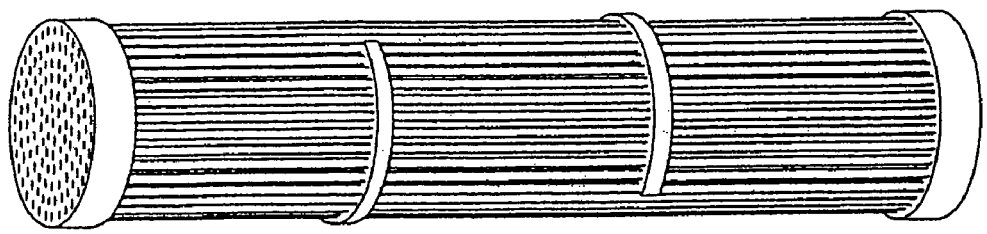
FIG. 6: Illustrates a separation module produced according to the invention, having spacers.

Capillary Bundle with Perforated Plate (FIGS. 4 to 6)

Sintered porous capillaries having an external diameter of 2.9 mm and an internal diameter of 2.0 mm, comprising 99.8% of alumina, are cut to a length of 320 mm. The perforated plates (FIG. 4) at the ends of the capillary bundle consist of dense alumina. They have an external diameter of 32 mm and 55 holes are arranged uniformly in segments and having a diameter of 2.9 mm. Both materials have a linear coefficient of thermal expansion of $(7.6\text{-}7.8) \, 10^{-6} K^{-1}$. For the production of the perforated plates, alumina powder having a mean particle size of 0.8 µm, doped with MgO, is extruded in stiff-plastic form. For plastication of the alumina, the latter is introduced together with 5% of water-soluble cellulose, 3% of nonionic surfactant, 2% of wax and 10% of water into a twin-screw kneader. After a kneading time of about 2 hours, the stiff-plastic material is extruded in a vacuum screw extruder as a perforated extrudate having a length of 750 mm. The die for the perforated extrudate consists of a sleeve whose internal diameter is 35.5 mm and 55 pins whose diameter is 3.2 mm. The drying of the mouldings is effected in a conditioned cabinet, beginning at 28° C. and 100% humidity. At this time, the moisture content of the mouldings is still 10%. After 72 hours, the drying is complete. The moisture content of the blanks is 2%. The dried blanks are cut to a length of 10 mm and 55 capillaries are inserted into 2 perforated plates so that the ends of the capillaries are each flush with the end faces of the perforated plates (FIG. 5). In this position, the ends are fixed by means of an organic adhesive. After drying for 2 hours at 80° C., the capillary bundle blanks are sintered horizontally at 1580° C. under an oxidizing atmosphere. During the sintering process, all the organic material burns away and the perforated plate shrinks onto the capillaries. A strong connection forms. Finally, the end faces of the perforated plates are sealed gas-tight by means of a glass. FIG. 6 shows an embodiment with spacers for controlling the flow between the capillaries.

EXAMPLE 5

Figure 7:
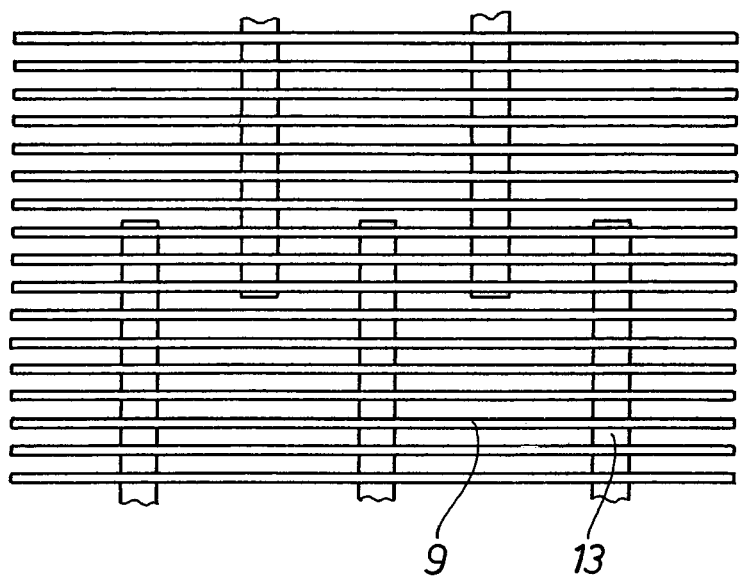
FIG. 7: Illustrates capillaries pressed into film strips in plan view a), and side view b).
Figure 7:
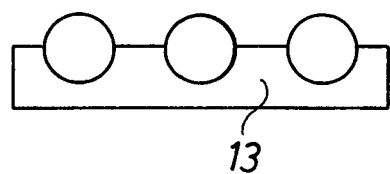
Figure 8:
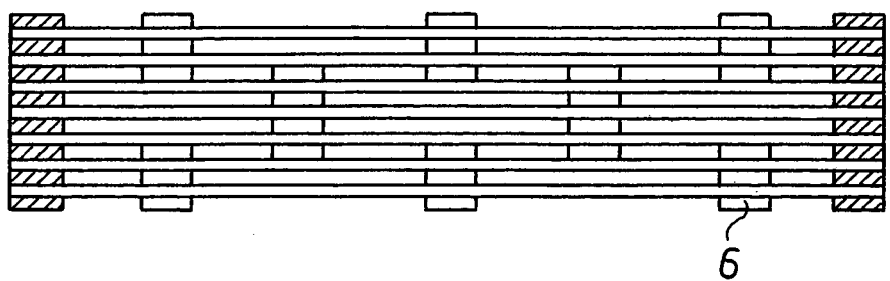
FIG. 8: Illustrates a capillary bundle of the invention after rolling up, shown schematically in section.

Capillary Bundle Wound with Film Strips (FIGS. 7 and 8)

Sintered porous capillaries 9 having an external diameter of 1.4 mm and an internal diameter of 1.0 mm, comprising 99.8 of alumina are cut to a length of 350 mm. These cut pieces are pressed, as shown in FIG. 7, parallel into soft ceramic film strips 13. These ceramic film strips 13 have a thickness of 2 mm. The combination of capillaries 9 and strips 13 are then wound into a bundle, as shown in FIG. 8. As a result of the staggered mounting of film strips 13, chambers separated by baffle plates 6 (which also function as spacers) and having an exactly defined size form between the capillaries 9, so that meander-flow can subsequently take place through the module. Sealing of the ends, which is carried out analogously to example 3, follows as a further processing step, it being possible to dispense with the mould bottom since the capillaries of the bundle are held the correct distance apart by the strips.

LIST OF REFERENCE NUMERALS USED

1 Feed
2 Retentate
3 Permeate
4 Sweep (flushing liquid)
5 Filter element
6 Baffle plate/spacer
7 Housing
8 Gypsum mould
9 Capillary
10 Casting slip
11 Unsintered end plate
12 Sintered end plate
13 Film strip

We claim:

1. A separation module comprising at least one bundle comprising a plurality of sintered porous ceramic capillaries arranged in parallel and joined together by staggered ceramic film strips pressed at least partially around and connecting adjacent sintered porous ceramic capillaries, the plurality of sintered porous ceramic capillaries and said staggered ceramic film strips being wound into said at least one bundle, the said staggered ceramic film strips when wound into said at least one bundle functioning as baffle plates, each of said sintered porous ceramic capillaries in the bundle having an external diameter ranging from 0.3 mm to 10 mm and an internal diameter ranging from 0.1 mm to 8 mm, each of said sintered porous ceramic capillaries in the bundle being spaced apart from an adjacent sintered porous ceramic capillary in the bundle by a defined distance established by said staggered ceramic film strips, and an end of each of said sintered porous ceramic capillaries passing through a perforated ceramic disc at a defined distance from an end of an adjacent sintered porous ceramic capillary also passing through said perforated ceramic disc.

2. The separation module of claim 1, wherein said end plate is shrunk-fit to said capillaries.

3. Separation module according to claim 1, wherein the end plate is a perforated plate and the module further comprises a housing, which housing encloses the bundle, the housing having an inlet and/or outlet pipe in fluid communication with the inside of the sintered porous ceramic capillaries for a first material flow and/or an outlet pipe in fluid communication with the innerspace between the sintered porous ceramic capillaries for a second material flow, wherein the distance between the sintered porous ceramic capillaries is further kept constant by spacers.

4. Separation module according to claim 1, wherein said external diameter ranges from 1 mm to 2.5 mm and said internal diameter ranges from 0.7 to 1.5 mm.

5. Separation module according to claim 1, wherein the distance between sintered porous ceramic capillaries in the bundle is 0.05-10 mm.

6. Separation module according to claim 5, wherein said distance is <3 mm.

7. Separation module according to claim 1, wherein the distance between the sintered porous ceramic capillaries in the bundle is established by said staggered ceramic film strips as a function of the permeate flow and permeate medium.

8. Separation module according claim 1, wherein the bundles of capillaries have a diameter of from 10 mm to 250 mm.

9. Separation module according to claim 8, wherein said diameter is from 20 mm to 50 mm.

10. Separation module according to claim 1, wherein the sintered porous ceramic capillaries have, on the inside, a thin membrane having separation activity.

11. Separation module according to claim 1, wherein the sintered porous ceramic capillaries have, on the outside, a thin membrane having separation activity.

12. Separation module according to claim 1, wherein several bundles of sintered porous ceramic capillaries are arranged parallel to each other in a housing and the separation module further comprises a feed space and a permeation space.

13. Separation module according to claim 12, wherein the housing comprises stainless steel and the feed space and permeation space is sealed by an elastomer O-ring, a graphite seal or a sealing compound.

14. Separation module according to claim 12, wherein the housing comprises ceramic and the feed space and permeation space is sealed at joints by ceramic- or glass-containing slip, paste or adhesive.

15. A membrane reactor comprising the separation module of claim 1, wherein the individual sintered porous ceramic capillaries are coated with a catalyst or are themselves a catalyst or the catalyst is otherwise present in the module.

16. A membrane separation process, wherein a fluid to be separated is passed through a separation module of claim 1, having a feed space and a permeation space, and wherein a vacuum is applied to the permeation space.

17. A method of producing a separation module according to claim 1, said method comprising: (a) providing a plurality of sintered porous ceramic capillaries arranged in parallel, (b) joining the sintered porous ceramic capillaries together by pressing staggered ceramic film strips at least partially around adjacent sintered porous ceramic capillaries to connect them, each of said sintered porous ceramic capillaries thereby being spaced apart from an adjacent sintered porous ceramic capillary by a defined distance established by said staggered ceramic film strips, (c) winding the plurality of sintered porous ceramic capillaries and staggered ceramic film strips into said at least one bundle and (d) passing an end of each of said sintered porous ceramic capillaries through an perforated ceramic disc at a defined distance from an end of an adjacent capillary also passing through said perforated ceramic disc.

18. Method according to claim 17, which further comprises placing sintered porous ceramic capillaries in holes at the bottom of a mold, filling this mold with a polymer-, ceramic- and/or glass-containing casting compound and, after demolding, cutting off the projecting ends of the capillaries.

19. Method according to claim 17, which further comprises inserting sintered porous ceramic capillaries into perforated discs and sealing the joints between the two with the use of polymer-, ceramic- or glass-containing slips, pastes or adhesives.

20. Method according to claim 17, which further comprises inserting sintered porous ceramic capillaries into unsintered ceramic perforated discs and firmly connecting by shrinkage of the perforated disc.

21. Method according to claim 17, which further comprises inserting unsintered porous ceramic capillaries into unsintered ceramic perforated discs and firmly connecting by co-firing.

22. Method according to claim 17, which further comprises winding sintered porous ceramic capillaries with at least one strip of polymer-, ceramic- and/or glass-containing film, braid or woven fabric and firmly connecting by shrinkage during curing of the film.

23. Method according to claim 17, which further comprises winding unsintered porous ceramic capillaries with at least one strip of ceramic- and/or glass-containing film, braid or woven fabric and firmly connecting by co-firing.

24. Method according to claim 17, which further comprises coating the sintered porous ceramic capillaries on their inside or outside walls with a membrane having separation activity and, in the case of a completely ceramic capillary bundle, coating with the membrane having separation activity after completion of the capillary bundle in one step.

25. Method according to claim 17, which further comprises coating the sintered porous ceramic capillaries on their inside or outside walls with a membrane having separation activity, wherein a nonceramic component is present in the capillary bundle, and the capillaries are coated with the membrane having separation activity prior to installation in the module.

\* \* \* \* \*